Sept. 9, 1924.  1,507,810
G. O. BRANDT
UPHOLSTERY UNIT FOR VEHICLE BODIES AND THE LIKE
Filed March 2, 1923
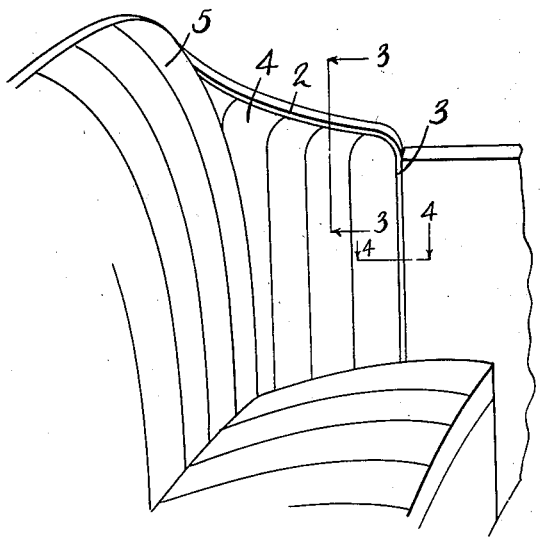
Fig. I.
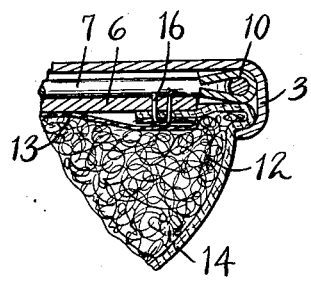
Fig. IV.
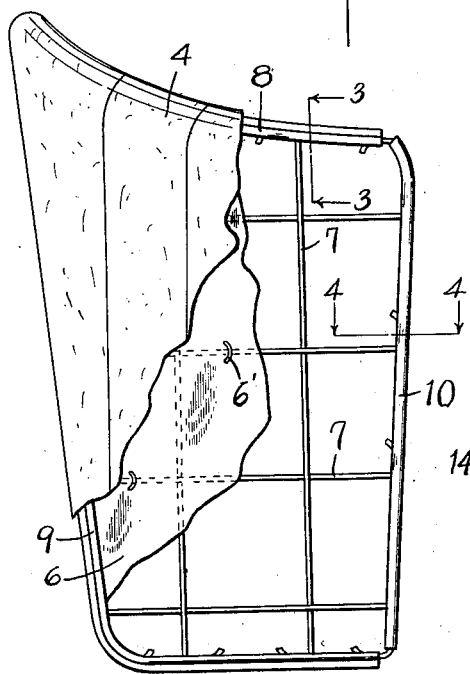
Fig. II.
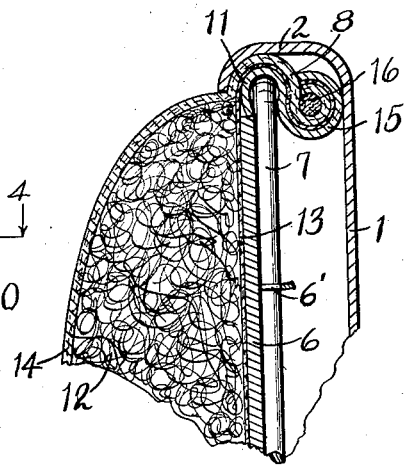
Fig. III.
Inventor
Gustav O. Brandt
By Chappell T Earl
Attorneys Patented Sept. 9, 1924.

1,507,810

UNITED STATES PATENT OFFICE.

GUSTAV O. BRANDT, OF DETROIT, MICHIGAN, ASSIGNOR TO L. A. YOUNG INDUSTRIES, INC., OF DETROIT, MICHIGAN.

UPHOLSTERY UNIT FOR VEHICLE BODIES AND THE LIKE.

Application filed March 2, 1923. Serial No. 622,423.

*To all whom it may concern:*

Be it known that I, GUSTAV O. BRANDT, a citizen of the United States, residing at 5231 Military Ave., Detroit, Michigan, have invented certain new and useful Improvements in Upholstery Units for Vehicle Bodies and the like, of which the following is a specification.

This invention relates to improvements in upholstery units for vehicle bodies and the like.

In the upholstering of vehicle bodies, it is desirable to form the upholstery in assembled units and assemble the units in the body as complete units. In the accompanying drawings, I have conventionally shown a vehicle body of metal provided with inwardly projecting flanges adapted to receive the edges of the upholstery.

The main objects of this invention are:

First, to prove an improved upholstery unit which is strong and rigid and at the same time comparatively light in weight.

Scond, to provide an improved upholstery unit in which the upholstery covering is secured so that it is not likely to become loosened in use as frequently results from methods now generally practiced.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a fragmentary inside perspective view of a motor vehicle embodying the features of my invention, the parts being shown mainly in conventional form.

Fig. II is a front elevation of an upholstery unit embodying the features of my invention, parts being broken away to better illustrate the structural details.

Fig. III is an enlarged detail vertical section on a line corresponding to line 3—3 of Figs. I and II.

Fig. IV is an enlarged detail horizontal section on a line corresponding to line 4—4 of Figs. I and II.

In the drawing similar reference characters refer to similar parts throughout the several views, and the sectional views are taken looking in the direction of the little arrows at the ends of the section lines.

Referring to the drawing, 1 represents a vehicle body formed of metal having an inwardly projecting flange 2 at its upper edge extending across the back and at the ends of the seat and continued into a vertical flange 3 at the door opening.

In the embodiment illustrated, I show a seat end upholstery unit 4 at the end of the seat and a seat back upholstery unit 5. These units are in practice substantially the same in structure, and therefore, I illustrate only the one unit.

My improved upholstery unit comprises a panel board 6 which is supported by a grid 7 of crossed wires, the panel board being stitched or stapled to the wires at 6'. The ends of these wires are secured to the frame members 8, 9 and 10, the frame members 8 and 9 being formed of strips of S cross section while the frame member 10 is of U-cross section as best shown in the sectional views of Figs. III and IV. The ends of the wires are turned laterally as shown in the drawing and clamped within the inwardly facing channels 11 of the frame members 8 and 9 and in the channel of the U-shaped member. This provides a supporting frame for the panel board which in practice is formed of binder board or the like.

The upholstering, consisting of the filling 12, the inner covering 13 and outer covering 14 is secured by means of the outwardly facing channel 15 of the frame members 8 and 9 and by staples or tacks 16, the front edges of the upholstery covering being lapped upon the panel board and secured thereto as shown in Fig. IV, and then being turned rearwardly and the other edges secured within the channel 15 by clamping the channel thereon. These edges secured within the channel 15 are preferably provided with a beading cord 16, although this is not an essential.

With the parts thus arranged, I provide upholstery units which are economical in the parts thereof and assembling and are comparatively light in weight. I have not illustrated or described various modifications and adaptations which might be desirable in adapting my modifications to different types of vehicle bodies as I believe the disclosure made will enable those skilled in the art to which my invention relates to embody or adapt the same as may be desired.

Having thus described my invention, what I claim as new and desire to secure by Letters Patent, is:

1. An upholstering unit comprising a frame member of S cross section providing an outwardly facing upholstery securing channel and an inwardly facing channel, said frame comprising top, rear and bottom members, a U-shaped front frame member, a backing panel comprising a supporting grid of crossed wires, and a panel board secured therto, the ends of said grid wires being clamped within said inwardly facing channel and within said front frame member, and upholstering comprising a filling material and an inner and outer covering therefor, the front edges of said covering being lapped upon and secured to said backing panel board and turned inwardly over the securing means, the other edges of said coverings being clamped within said outwardly facing channel of said frame.

2. An upholstering unit comprising a frame of S cross section providing an outwardly facing upholstery securing channel and an inwardly facing channel, said frame comprising top, rear and bottom members, a U-shaped front frame member, a backing panel comprising a supporting grid of crossed wires, and a panel board secured thereto, the end of said grid wires being clamped within said inwardly facing channel and within said front frame member, and an upholstery covering lapped upon and secured to said backing panel board and turned inwardly over the securing means, the other edges of said covering being clamped within said outwardly facing channel of said frame.

3. An upholstering unit comprising a backing panel, a frame member of S cross section providing an outwardly facing upholstery securing channel and an inwardly facing channel which is engaged with said backing panel, a U-shaped strip engaged with the opposite edge of said backing panel, and upholstery comprising a filling material and an inner and outer covering therefor, said coverings being lapped upon and secured to said backing panel at the edge of said strip and turned inwardly over the securing means, the opposite edges of said coverings being secured within the outwardly facing channel of said frame member.

4. An upholstering unit comprising a backing panel, a frame member of S cross section providing an outwardly facing upholstery securing channel and an inwardly facing channel which is engaged with one edge of said backing panel, a U-shaped strip engaged with another edge of said backing panel, and an upholstery covering lapped upon and secured to said backing panel at the edge of said strip and turned inwardly over the securing means and secured within the outwardly facing channel of said frame member.

5. An upholstering unit comprising a frame member of S cross section providing an outwardly facing upholstery securing channel and an inwardly facing channel, a U-shaped front frame member, a backing panel comprising a supporting grid of crossed wires and a panel board secured thereto, the ends of the wires being clamped within said inwardly facing channel and within said front frame member, and an upholstery covering lapped upon and secured to said backing panel and turned inwardly over the securing means and secured within said outwardly facing channel of said frame member.

6. An upholstering unit comprising a frame member of S cross section providing an outwardly facing upholstery securing channel and an inwardly facing channel, a U-shaped front frame member, a backing panel secured within said inwardly facing channel and within said front frame member, and an upholstery covering lapped upon and secured to said backing panel and turned inwardly over the securing means and secured within said outwardly facing channel of said frame member.

7. An upholstery unit comprising a frame member having top, bottom and rear members, said frame member being of S-cross section and providing an outwardly facing upholstery securing channel and an inwardly facing channel, a backing panel secured within said inwardly facing channel, and an upholstery covering having its front edge secured to said backing panel and its top, bottom and rear edges secured within said outwardly facing channel of said frame member.

8. An upholstery unit comprising a frame member of S-cross section providing an outwardly facing upholstery securing channel and an inwardly facing channel, a backing panel secured within said inwardly facing channel, and an upholstery covering having at least one edge secured to said backing panel and its other edges secured within said outwardly facing upholstery channel.

9. An upholstering unit comprising a panel, a frame member of S cross section providing an outwardly facing upholstery securing channel and an inwardly facing channel which is clamped upon one of the edges of the panel, a U-shaped strip clamped upon the opposite edge of said panel, and upholstery comprising a filling material and an inner and outer covering therefor, said coverings being lapped upon and tacked to said panel at the edge of said strip and folded inwardly over the tacks, the opposite edges of said coverings being clamped within the outwardly facing channel of said frame member.

10. An upholstering unit for vehicle bodies comprising a panel, a frame member of S cross section providing an outwardly facing upholstery securing channel and an inwardly facing channel which is clamped upon one of the edges of the panel, a U-shaped strip clamped upon another edge of said panel, and an upholstery covering being lapped upon and secured to said panel at the edge of said strip and folded inwardly over the securing means and clamped within the outwardly facing channel of said frame member.

11. An upholstery unit comprising a rear frame member of S cross section providing an outwardly facing upholstery securing channel and an inwardly facing channel, a U-shaped front frame member, a backing panel comprising a supporting grid of crossed wires and a panel board secured thereto, the ends of the wires being clamped within said inwardly facing channel and within said front frame member, an upholstery covering lapped upon said backing panel, and means for securing said covering to said backing panel adjacent said front frame member, said covering being turned inwardly over said securing means and secured within said outwardly facing channel of said rear frame member.

12. An upholstery unit comprising a rear frame member of S cross section providing an outwardly facing upholstery securing channel and an inwardly facing channel, a front frame member, a backing panel secured within said inwardly facing channel of said rear frame member and to said front frame member, an upholstery covering lapped upon said backing panel, and means for securing said covering to said backing panel adjacent said front frame member, said covering being turned inwardly over the said securing means and secured within said outwardly facing channel of said rear frame member.

13. An upholstering unit comprising a panel of fibre board, a metal frame member of S cross section providing an outwardly facing upholstery securing channel and an inwardly facing channel which is clamped upon the top, rear and bottom edges of the panel, a U-shaped metal binding strip clamped upon the front edge of said panel, and upholstering comprising a filling material and an inner and an outer covering therefor, the front edges of said coverings being lapped upon and tacked to said panel at the edge of said front binding strip and folded over the tacks, the top, bottom and rear edges of said coverings being clamped within said outwardly facing channel of said frame.

14. An upholstering unit comprising a panel of fibre board, a metal frame member of S cross section providing an outwardly facing upholstery securing channel and an inwardly facing channel which is clamped upon the top, rear and bottom edges of the panel, a U-shaped metal binding strip clamped upon the front edge of said panel, and upholstering comprising a covering secured to said panel along its front edge and having its other edges clamped within said outwardly facing channel of said frame.

In witness whereof, I have hereunto set my hand and seal.

GUSTAV O. BRANDT, [L. S.]